2,905,667

DI-IMIDAZOLE DERIVATIVES AND PROCESS FOR THEIR MANUFACTURE

Adolf Emil Siegrist, Basel, and Franz Ackermann, Binningen, Switzerland, assignors to Ciba Limited, Basel, Switzerland, a Swiss firm No Drawing. Application August 25, 1955
Serial No. 530,609

Claims priority, application Switzerland August 27, 1954

13 Claims. (Cl. 260—240)

It is known that di-imidazole derivatives of the general formula

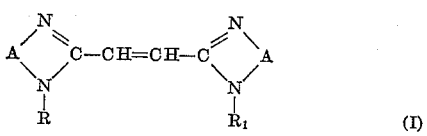

in which A represents an aromatic nucleus, which may contain substituents and in which two vicinal carbon atoms are bound to the two imidazole-nitrogen atoms, and R and $R_1$ represent hydrogen or the same or different substituents, and salts of these derivatives and water soluble derivatives therof, are useful as optical brightening agents.

The present invention provides a process for the manufacture of the above and similar compounds of the general formula

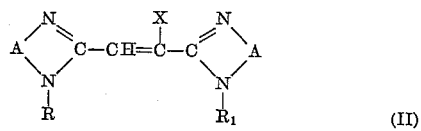

in which A, R and $R_1$ have the meanings given above, and X represents hydrogen or a hydroxyl group, wherein a compound of the general formula

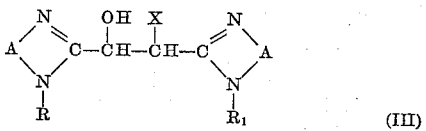

in which A, R, $R_1$ and X have the meanings given above, or a salt of such compound, is treated to eliminate water therefrom, and, if desired, the di-imidazole derivative so obtained is subjected to the action of a sulphonating agent, an alkylating agent, an oxyalkylating agent or an arylalkylating agent.

The compounds used as starting materials can be prepared by the process described in the applicants' copending application, Ser. No. 530,608, filed August 25, 1955, now Patent 2,828,317. The radical A in the above formula may be mononuclear or polynuclear. It may be, for example, a naphthalene or phenylene radical, which may contain as substituents halogen atoms, or alkyl or alkoxy groups. Advantageously it is an unsubstituted phenylene radical. The substituents R and $R_1$ advantageously represent hydrogen. They may, however, represent any desired radicals, for example, of aromatic or heterocyclic character. They may be more especially aliphatic or araliphatic radicals, and advantageously alkyl or oxalkyl radicals of low molecular weight, such as a methyl or oxyethyl group. The salts of these compounds may be derived from any desired inorganic or organic acids, for example, sulfuric acid, hydrochloric acid, nitric acid, formic acid or acetic acid.

The elimination of water in the process of the invention may be carried out in a simple manner by heating a compound of the Formula III or a salt thereof at a raised temperature, for example, of 150–220° C. The heating may be carried out in the absence of a solvent. It is, however, of advantage to use a high boiling organic solvent, such as ortho-dichlorobenzene, a trichlorobenzene, tetralin, decalin or nitrobenzene. In this case it is of advantage to carry out the elimination of water at the boiling temperature of the solvent, and to pass the solvent before returning it to the reaction vessel through a water separator, in which the water split off by the reaction is separated. It may be of advantage to use an agent capable of eliminating water, such as sodium bisulfate, zinc chloride or phosphorus pentoxide, and furthermore it is advantageous to carry out the splitting off reaction in the presence of an inert gas, such as nitrogen.

For the production of sulfonated derivatives there is advantageously used, as an agent capable of eliminating water, concentrated sulfuric acid or oleum, that is to say, sulfuric acid containing sulfur trioxide, whereby the elimination of water and the sulfonation are carried out in a single operation.

A very advantageous process for making compounds of the Formula II consists in combining the elimination of water with the production of the starting compound of the Formula III by carrying out the elimination of water directly in the reaction mixture without first isolating the compound of the Formula III after it has been formed. Accordingly, in this form of the process a suitable aromatic ortho-diamine or a salt thereof, if desired, in the presence of a catalyst, is reacted with malic acid or tartaric acid or a functional derivative of such acid at a moderately high temperature, and then carrying out the elimination of water at a high temperature, and if desired, treating the di-imidazole derivative so obtained with a sulfonating, alkylating, oxyalkylating or aralkylating agent. As moderately high temperature there is to be understood a temperature within the range of about 80° C. to 140° C., and as a high temperature a temperature within the range of about 150° C. to about 220° C. The components may be melted together in a simple manner and the melt subjected to the aforesaid temperatures until water no longer escapes. Advantageously, the process is carried out by using a high boiling organic solvent of the kind mentioned above, and the condensation reactions and splitting off of water are brought about in stages by maintaining the appropriate temperatures for appropriate periods.

As aromatic ortho-diamines suitable as starting materials in the present process there are to be understood those in which one amino group is primary and the other amino group is primary or secondary. Such ortho-diamines are, for example, ortho-phenylene diamine, 1:2-naphthylene diamine, and also isopropyl-ortho-phenylene diamine, 1 - methoxy - 3:4 - diaminobenzene, 1-amino-2 - monomethylamino - benzene or 1-chloro-3:4-diaminobenzene. There is advantageously used ortho-phenylene diamine. Instead of the ortho-diamines there may be used ortho-nitramines, which are acylated and then the nitro group is reduced and the di-imidazole is formed by ring closure. As derivatives of malic acid or tartaric acid, which may be used for the condensation instead of the free acids, there may be mentioned above all esters with aliphatic alcohols of low molecular weight.

The alkylation or aralkylation of the di-imidazoles, which may be carried out, if desired, can be brought about in the usual manner, for example, by treatment with an alkyl halide, an oxyalkyl halide or aralkyl halide, such as benzyl chloride, advantageously with the addition of an acid-binding agent. For alkylation there may be used dialkyl sulfates, such as dimethyl sulfate. For sulfonation, which may be carried out, if desired, the usual sulfonating agents may be used.

The compounds of the general Formula II in which X represents hydrogen and therefore correspond to the above general Formula I, are valuable optical brightening agents. Those compounds of the general Formula II, in which X represents a hydroxyl group and therefore correspond to the general Formula

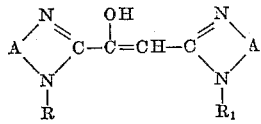

or

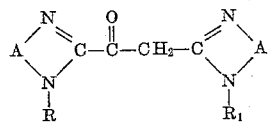

in which A, R and $R_1$ have the meanings given above are new and exhibit an intense fluorescence in ultra-violet light. They can therefore be used for producing optical effects. In admixture with dyestuffs they possess the property of enhancing the brillance of the dyestuffs. The compounds may also be used as coupling components in the manufacture of azo-dyestuffs.

The following examples illustrate the invention, the parts being by weight unless otherwise stated, and the relationship of parts by weight to parts by volume being the same as that of the kilogram to the litre:

*Example 1*

75 parts of the monosulfate of the condensation product of malic acid with ortho-phenylene diamine described below, are stirred in the course of 30 minutes, while cooling, into 150 parts by volume of oleum containing 27 percent of $SO_3$, the temperature not being allowed to rise above 25° C. The whole is stirred for a few hours longer at 20–25° C. until a test portion of the sulfonation mixture dissolves to give a clear solution in a cold sodium carbonate solution of 10 percent strength. The reaction mixture is then introduced into a mixture of 400 parts of ice and 400 parts of water. The precipitated light yellow disulfonic acid of the formula

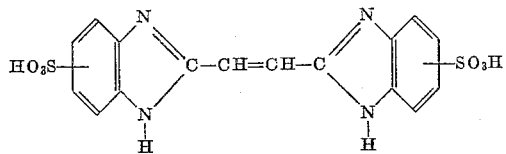

is filtered off and washed neutral to Congo with cold water. The filter residue is suspended in water at 70–80° C. and neutralized with an aqueous solution of sodium hydroxide. The solution so obtained is evaporated to dryness. The resulting sodium $\alpha{:}\beta$-di-[benzimidazyl-(2)]-ethylene disulfonate is a light yellow powder, of which aqueous solutions when subjected to ultra-violet rays exhibit an intense blue-violet fluorescence.

By using in this example, instead of 150 parts by volume of oleum containing 27 percent of $SO_3$, 450 parts of concentrated sulfuric acid and heating the mixture rapidly to 200° C., and maintaining that temperature for 15 minutes, there is obtained a product having similar properties.

The monosulfate of the condensation product of malic acid with ortho-phenylene diamine used as starting material in this example may be prepared as follows:

Into 2000 parts of sulfuric acid of 40 percent strength there are introduced, with the exclusion of air and while stirring, 432 parts of ortho-phenylene diamine and then 268 parts of d:l-malic acid. The temperature is then raised in the course of 2 hours to the gentle boil and the clear solution is stirred for 18:48 hours with the exclusion of air at 105–110° C. The reaction mixture is then cooled to 10–15° C. and stirred in the cold for a few hours. The crystalline mass which precipitates is filtered off, and the filter residue is washed neutral to Congo with water and dried. The resulting condensation product of the formula

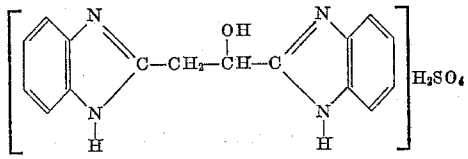

is a slightly yellowish to greenish powder, which is sparingly soluble in water and in the usual organic solvents. It dissolves in concentrated sulfuric acid with a pale blue coloration.

*Example 2*

376 parts of the condensation product described in the last paragraph of Example 1 are stirred in 1200 parts of 1:2:3:4-tetrahydronaphthalene, the temperature being raised in the course of 2 hours from 140° C. to 205° C. and maintained at 205° C. until the elimination of water ceases. After cooling the mixture it is filtered, the filter residue is washed with ether, and the reaction product of the formula

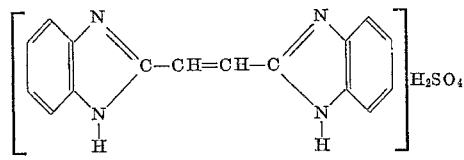

is dried.

By carrying out the elimination of water in the above example without a diluent, there is obtained a product having similar properties. The elimination of water may also be carried out in the presence of zinc chloride or sodium bisulfate, with or without the use of a diluent.

*Example 3*

216 parts of ortho-phenylene diamine are heated with 134 parts of d:l-malic acid with the exclusion of moisture in the course of 3–5 hours from 110° C. to 160°. The initially clear melt becomes gradually green and thickly liquid, and finally solidifies to a pale green mass. In order to complete the elimination of water the temperature is increased to 185–190° C. and maintained at 190–195° C. until water no longer escapes. After being cooled the reaction mass is recrystallized from a large quantity of hot dilute hydrochloric acid with the addition of a small amount of animal charcoal. The hydrochloride so obtained is again dissolved in hot dilute hydrochloric acid, and the condensation product is precipitated from the solution by means of ammonia, filtered off, and washed neutral with water. There is obtained $\alpha{:}\beta$-di-[benzimidazyl-(2)]-ethylene of the formula

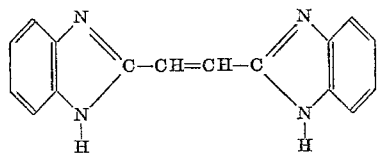

which is an almost colorless powder which is sparingly soluble to insoluble in water and the usual organic solvents. When dissolved in an alcoholic solution of sodium hydroxide and applied to filter paper it exhibits a blue-violet fluorescence in ultra-violet light.

The condensation may also be carried out with the addition of boric acid.

*Example 4*

108 parts of ortho-phenylene diamine, 67 parts of d:l-malic acid and 600 parts of ortho-dichlorobenzene are stirred together with the exclusion of air. The temperature is raised to the boil in the course of 3–5 hours and maintained at the boil until the elimination of water ceases, the water being removed by means of a water separator. After being cooled, the reaction product is filtered off, washed with hot alcohol and dried. There is obtained α:β-di-[benzimidazyl - (2)] - ethylene of the formula

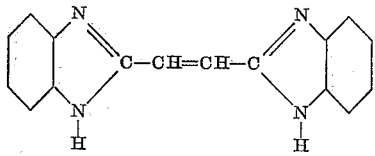

in the form of a bright, slightly greenish powder, which is soluble in an alcoholic solution of sodium hydroxide.

Instead of ortho-dichlorobenzene there may be used another inert organic solvent such, for example, as trichlorobenzene, 1:2:3:4-tetrahydronaphthalene or a mixture of such solvents.

*Example 5*

37.6 parts of α:β-di-[benzimidazyl-(2)]-mono-oxyethane-monosulfate are added to a solution of 30 parts of sodium hydroxide in 300 parts of ethyl alcohol at 70° C., and the mixture is stirred for one hour at 70–75° C. 38 parts of benzyl chloride are then added dropwise in the course of 2 hours, and the mixture is stirred for 18 hours at 70–75° C. After cooling the mixture, the precipitated yellowish condensation product is filtered off, washed with alcohol and water, and recrystallized from alcohol. In this manner there is obtained α:β-di-[N-benzyl-benzimidazyl-(2)]-ethylene, which is identical with the product obtainable by subsequently benzylating the product from maleic anhydride and ortho-phenylene diamine.

*Example 6*

376 parts of α:β-di-[benzimidazyl-(2)]-mono-oxyethane-monosulfate are heated in an electric drying cabinet in an atmosphere of nitrogen for 6–8 hours at 160° C., the powder being mixed occasionally. In this manner there is obtained in very good yield α:β-di-[benzimidazyl-(2)]-ethylene monosulfate.

The temperature of the drying cabinet may be increased, whereby the period required for the elimination of water can be reduced. Alternatively, the treatment may be carried out at a somewhat lower temperature, but the reaction period required is longer.

Instead of a drying cabinet, there may be used a paddle drier, for example, of the Venuleth type. When using a paddle drier it may be charged with a moist paste of α:β-di-[benzimidazyl-(2)]-mono-oxyethane monosulfate, such as is obtained in the manufacture of this compound, and the drying and elimination of water are carried out in a single operation.

Derivatives of the α:β-di-[benzimidazyl-(2)]-ethylene can be obtained as follows:

(a) 108 parts of the α:β-di-[benzimidazyl-(2)]-ethylene monosulfate obtainable as described in the first paragraph of this example are introduced into a solution, heated at 70–75° C., of 60 parts of sodium hydroxide in 600 parts of ethyl alcohol, while stirring. 36 parts of ethylene chlorhydrin are then introduced dropwise in the course of 3 hours, and the mixture is then stirred for about 2 hours longer at 70–80° C. The greater part of the alcohol is then distilled off, the residue is mixed with water, and neutralized with sulfuric acid or another acid. The precipitated condensation product is filtered off, washed with water and dried. The resulting α-[benzimidazyl-(2)]-β-[N-hydroxyethylbenzimidazyl-(2)]-ethylene is a yellowish powder which is sparingly soluble in the usual solvents. It is an optical brightening agent, which is very suitable for use in admixture with synthetic detergents or soaps.

(b) The procedure is the same as described under (a), except that there are used 75 parts of dimethyl sulfate, instead of 36 parts of ethylene chlorhydrin. In this manner α:β-di-[N-methyl-benzimidazyl-(2)]-ethylene is obtained.

*Example 7*

30 parts of α:β-di-[benzimidazyl-(2)]-mono-oxyethane are added to a melt of 10 parts of water and 150 parts of zinc chloride at 160–170° C., and the whole is stirred for 10 hours at that temperature. 500 parts of cold water are then added dropwise, and the cooled mixture is mixed with concentrated hydrochloric acid until the reaction is distinctly acid; the precipitated hydrochloride of α:β-di-[benzimidazyl-(2)]-ethylene is then filtered off, washed with water and dried. The free base can be precipitated in the usual manner by mixing a solution thereof in hydrochloric acid with an alkali, for example, ammonia.

By using in this example, instead of 30 parts of α:β-di-[benzimidazyl-(2)]-mono-oxyethane, 30 parts of α-[benzimidazyl - (2)]-β-[N-hydroxyethyl-benzimidazyl - (2)]-mono-oxyethane there is obtained α-[benzimidazyl-(2)]-β-[N-hydroxyethyl-benzimidazyl-(2)]-ethylene.

*Example 8*

The procedure is the same as described in the first paragraph of Example 6, except that, instead of 376 parts of α:β-di-[benzimidazyl - (2)] - mono-oxyethane monosulfate, there is used an equivalent quantity of the monosulfate of α:β-di-[6 - methyl-benzimidazyl - (2)]-mono-oxyethane or of α:β-di-[6-methoxy-benzimidazyl-(2)] - mono-oxyethane or of α:β-di-[6 - chloro-benzimidazyl-(2)]-mono-oxyethane or of α:β-di-[N-methyl-benzimidazyl-(2)]-mono-oxyethane, and in this manner there are obtained by the elimination of water the corresponding ethylene derivatives.

*Example 9*

1000 parts of the product of the formula

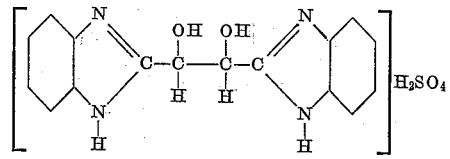

are heated for 6 to 8 hours at 170–180° C., whereby the elimination of water takes place. The resulting yellow compound has the formula

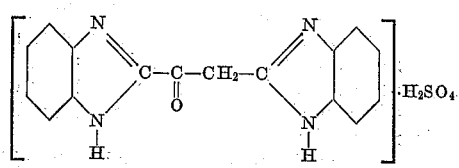

or

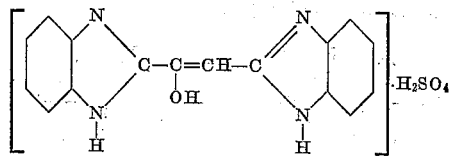

It dissolves clearly in dilute sodium hydroxide solution. Mineral acid solutions and also alkaline solutions of this compound exhibit a greenish blue fluorescence when applied to filter paper and exposed to ultra-violet rays. The compound couples in alkaline solution with diazonium salts to form azo-dyestuffs.

By using, instead of the monosulfate of a α:β-di-[benzimidazyl-(2)]-dioxyethane, an equivalent quantity of the monosulfate of α:β-di-[6-chloro-benzimidazyl-(2)]-dioxyethane or of α:β-di-[6-methyl-benzimidazyl-(2)]-dioxyethane or of α:β-di-[6-methoxy-benzimidazyl-(2)]- dioxyethane or of α-[benzimidazyl-(2)]-β-[N-hydroxy-ethyl-benzimidazyl-(2)]-dioxyethane or of α:β-di-[N-benzyl-benzimidazyl-(2)]-dioxyethane the corresponding ethylene compounds are obtained accompanied by the elimination of water.

*Example 10*

The procedure is the same as described in Example 1, except that there is used instead of the monosulfate of α:β-di-[benzimidazyl-(2)]-mono-oxyethane, the monosulfate of α:β-di-[benzimidazyl-(2)]-di-oxyethane or of α:β-di-[N-methyl-benzimidazyl-(2)]-dioxyethane. There are obtained by the elimination of water and sulfonation the corresponding ethylene derivatives.

*Example 11*

27.6 parts of the product obtained according to Example 9, 15 parts of caustic soda solution of 30 percent strength and 50 parts of pyridine are dissolved in 250 parts of water and the solution cooled to 0° C.

14.15 parts of 2-amino-4-chloro-1-methylbenzene are diazotized in the usual manner and the diazo solution clarified by filtration and then at 0–4° C. run into the coupling solution. The reaction mixture is stirred at room temperature for 2 hours, after which coupling is complete. The mixture is then heated to 40–45° C. and rendered acid to Congo by the addition of hydrochloric acid of 10 percent strength. The pale yellow dyestuff suspension thereupon assumes an orange yellow coloration. It is stirred for 15 minutes and then filtered. It is washed with warm water until the filtrate is neutral and colorless, then dried under reduced pressure at 60°–70° C.

There are obtained about 30 parts of the dyestuff of the formula in the form of a yellow powder which dissolves in pyridine with a yellow coloration. It is difficultly soluble in alcohol, benzene hydrocarbons and other organic solvents. In concentrated sulfuric acid it dissolves with a red-orange coloration. It imparts to plastic materials, such as polyvinylchloride pure golden yellow shades.

What is claimed is:

1. A process for the manufacture of a di-imidazole compound selected from the group consisting of (1) a compound corresponding to the formula in which X represents a member selected from the group consisting of hydrogen and a hydroxyl group, Y is a member selected from the group consisting of hydrogen, chlorine, lower alkyl and lower alkoxy, and R and $R_1$ each represents a member selected from the group consisting of hydrogen, a lower alkyl radical, a lower hydroxyalkyl radical and a benzyl radical, and (2) an acid addition salt of such compound, which process comprises splitting off water from a member selected from the group consisting of (a) a compound corresponding to the general formula in which R, $R_1$, X and Y have the meanings given above, and (b) an acid addition salt of such compounds, by heating the latter at a temperature within the range from about 150° to about 220° C. until the formation of water ceases.

2. A process according to claim 1, wherein the reaction is performed by heating the starting material in an inert organic solvent at a temperature from about 150° C. to about 220° C.

3. A process according to claim 1, wherein the reaction is performed by heating the starting material in dry state in an atmosphere of an inert gas at a temperature of from about 150° C. to about 220° C.

4. A process for the manufacture of monosulfate of α:β-di-[benzimidazyl-(2)]-ethylene which comprises splitting off water from α:β-di-[benzimidazyl-(2)]-monohydroxyethane monosulfate by heating the latter in dry state in an atmosphere of nitrogen at about 150° C. to about 220° C. until the formation of water ceases.

5. A process for the manufacture of α-[benzimidazyl-(2)]-β-[N-hydroxyethyl-benzimidazyl-(2)]-ethylene which comprises splitting off water from α:β-di-[benzimidazyl-(2)]-monohydroxyethane monosulfate by heating the latter in dry state in an atmosphere of nitrogen at about 150° C. to about 220° C. until the formation of water ceases, and hydroxyethylating the compound obtained by means of ethylene chlorohydrin.

6. A process for the manufacture of α,β-di-[N-methyl-benzimidazyl-(2)]-ethylene which comprises splitting off water from α,β-di-[benzimidazyl-(2)]-monohydroxyethane monosulfate by heating the latter in dry state in an atmosphere of nitrogen at about 150° C. to about 220° C. until the formation of water ceases, and methylating the compound obtained by means of dimethylsulfate.

7. A process for the manufacture of α,β-di-[benzimidazyl-(2)]-hydroxyethylene monosulfate, which comprises splitting off water from α,β-di-[benzimidazyl-(2)]-dihydroxyethane by heating the latter in dry state in an atmosphere of nitrogen at about 150° C. to about 220° C. until the formation of water ceases.

8. α,β-Di-[benzimidazyl-(2)]-monohydroxyethylene.

9. A process for the manufacture of α:β-di-[benzimidazyl-(2)]-ethylene which corresponds to the formula which process comprises condensing ortho-phenylenediamine with malic acid by heating at about 80° C. to about 140° C. until the formation of water ceases, and splitting off water from the resultant condensation product by heating the latter at about 150° C. to about 220° C. until the formation of water ceases.

10. A di-imidazole which is represented by the formula in which R and $R_1$ each represents a member selected from the group consisting of hydrogen, a lower alkyl radical, a lower hydroxyalkyl radical and a benzyl radical, and Y is a member selected from the group consisting of hydrogen, chlorine, lower alkyl and lower alkoxy.

11. A di-imidazole which is represented by the formula

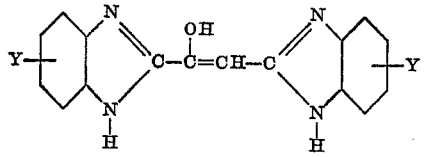

wherein Y is lower alkoxy.

12. A di-imidazole which is represented by the formula

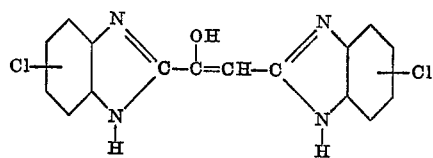

13. A di-imidazole which is represented by the formula

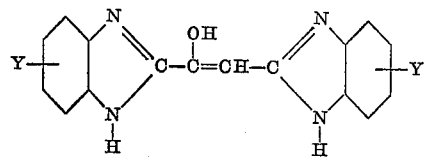

wherein Y is lower alkyl.

References Cited in the file of this patent
UNITED STATES PATENTS

| | | |
|---|---|---|
| 2,463,264 | Graenacher et al. | Mar. 1, 1949 |
| 2,483,392 | Meyer et al. | Oct. 4, 1949 |
| 2,488,094 | Graenacher et al. | Nov. 15, 1949 |

OTHER REFERENCES

Tout et al.: Chemical Abstracts, vol. 42, p. 583 (1948).

Ladenburg: Deutsche Chemische Gesellschaft, vol. 9, part 2, pp. 1524–30 (1876); vol. 10, pp. 1123–1126 (1877).

Beilstein: Handbuch der Organischen Chemie, 4th ed. (1921), vol. 3, p. 422.

Medinger: Journ. für Prakt. Chem., vol. 86 (Second Series), pp. 345–359 (1912).